United States Patent

[11] 3,576,125

| [72] | Inventors | Dieter Kockott<br>Ruckingen;<br>Burkhard Von Diemar, Butzbach,<br>Germany |
|---|---|---|
| [21] | Appl. No. | 808,402 |
| [22] | Filed | Mar. 19, 1969 |
| [45] | Patented | Apr. 27, 1971 |
| [73] | Assignee | Original Hanau Quarzlampen G.m.b.H.<br>Hanau, Germany |
| [32] | Priority | Apr. 8, 1968 |
| [33] | | Austria |
| [31] | | 4/A3388/68 |

[54] TEST APPARATUS TO TEST LIGHT AND HEAT EFFECTS ON SAMPLE SURFACES
7 Claims, 3 Drawing Figs.

[52] U.S. Cl. .................................................. 73/15,
73/150
[51] Int. Cl. ..................................................... G01n 17/00
[50] Field of Search ........................................... 73/15, 432
(P), (SIM), 150; 250/85, 88; 350/96, 1 (Cursory);
240/51.12

[56] References Cited
UNITED STATES PATENTS

| 2,741,691 | 4/1956 | Lee ............................... | 250/88X |
| 3,075,064 | 1/1963 | Bondonio ..................... | 240/51.12X |
| 3,202,811 | 8/1965 | Hall, Jr. ....................... | 73/432(SIM)X |
| 3,297,863 | 1/1967 | Robbiano ..................... | 240/51.12X |
| 3,316,405 | 4/1967 | Astheimer ..................... | 250/88X |
| 3,373,599 | 3/1968 | Higginbottom ............... | 73/15 |
| 3,413,441 | 11/1965 | Isobe et al. ..................... | 250/85X |

FOREIGN PATENTS

| 1,161,826 | 1/1964 | Germany ..................... | 350/96(B) |

Primary Examiner—S. Clement Swisher
Assistant Examiner—Daniel M. Yasich
Attorney—Flynn and Frishauf ABSTRACT: To provide for uniform radiation (heat or light) on a test sample of paints or the like, an elongated radiation source is located centrally of a cylindrical carrier. The test samples are located on the carrier and the ends of the cylindrical carrier are, in one embodiment, closed off by means of reflectors, so that the radiation at the ends is substantially uniform and the same as that reaching samples located in the center. In another embodiment, the radiation source is made more intense at the ends, for example by looping the source upon itself at the ends, or introducing additional radiation. In another embodiment, collimating discs are located in diametrical planes on the cylinder, so that the radiation transmitted from the central, axial source impinges substantially uniformly at the samples, so that the radiation intensity is compensated for end loss.

PATENTED APR 27 1971 3,576,125

TEST APPARATUS TO TEST LIGHT AND HEAT EFFECTS ON SAMPLE SURFACES

The present invention relates to a test apparatus, and more particularly to a test apparatus to test light and weather resistance of test samples such as paints, fabrics, or the like, in which the distribution of radiation, such as light, or heat is uniform over a cylindrical surface, so that the samples will be uniformly exposed to the radiation.

Testing of light, and weather resistance of colored, or painted materials, such as textiles, paint samples, plastics, and the like requires a test apparatus in which naturally occurring deteriorating conditions are greatly enhanced, so that the long time taken to obtain results after exposure of such samples to sunlight, can be shortened in the laboratory. Such apparatus can be made more efficient by utilizing the radiation source to the fullest; difficulties, however, having arisen in obtaining uniformity of radiation from various sources.

Test samples usually are rectangular or square, particularly when paints, lacquers and varnishes, or plastic materials or textiles are to be tested. Samples of this kind usually are exposed to radiation, such as light from a high intensity source. It is difficult to obtain completely uniform illumination, the usual sources providing at the marginal edges of the samples, only 80 percent of the radiation impinging on the center. The distribution of temperature on the samples likewise diminishes towards the outside. Yellowing, and other aging effects of lacquers, plastics and the like frequently appear particularly when a certain threshold of radiation (light, or heat) is exceeded. In some samples, the hue of color may change suddenly due to the combined illumination-temperature effects. Towards the center, an abrupt change in color can be noted, whereas the edges are substantially unaffected, since the temperature is below the threshold value. Test apparatus which does not have a perfectly uniform distribution of radiation, thus, will not yield reliable, always reproducible results.

It has been proposed to place samples along a spherical surface, and utilize a point source of radiation. This causes difficulties since the samples must be spherically curved, which interferes with their later use in other test apparatus, where they should be substantially flat.

It is an object of the present invention to provide a test apparatus to test samples for resistance to radiation which is simple, and provides uniform radiation on the surface of the samples.

Subject matter of the present invention: Briefly, an axial source of radiation is provided, surrounded by a cylindrical carrier surface on which the test samples are mounted. A radiation-directing means, directing the radiation from the source to the samples is provided which includes a radiation intensity compensating arrangement located in optical relationship with the source to compensate for fall-off of radiation at the ends of the cylindrical source. The radiation-compensating device may be formed as mirrors at the ends, means additionally creating radiation towards the ends, for example by looping an elongated radiation source thereat to provide for higher intensity, or by collimating discs which essentially direct radiation perpendicular on the test surface.

The invention will be described by way of example with reference to the accompanying drawings, wherein.

Figure 1:
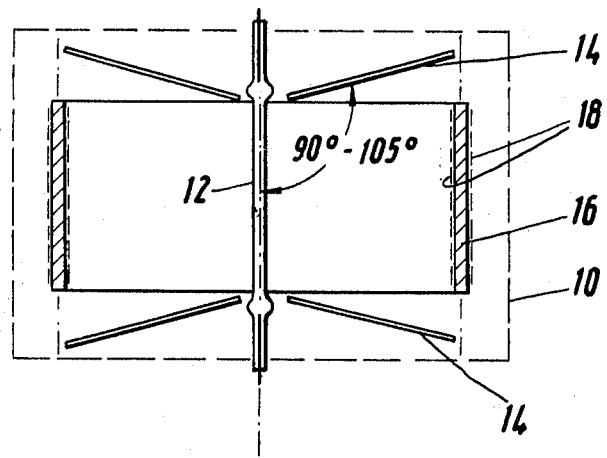
FIG. 1 is a schematic vertical cross-sectional view of a test apparatus, utilizing mirrors for compensating lower intensity of radiation at the axial ends.

The test apparatus may have any kind of housing or outside cover 10, illustrated in dashed lines. A longitudinal source of radiation, such as a high-intensity lamp, for example an arc lamp or the like is schematically indicated at 12. Source 12, which will be a source combined of light and heat will radiate axially, outwardly towards a cylindrical surface of a test sample carrier 16, on which test samples 18 are located, with some samples directed towards the inside to receive radiation and others, for comparison, directed away from the radiation.

The intensity of radiation which will reach the test samples 18 at the inside of the cylindrical surface will fall off towards the axial ends, in comparison with the radiation in the middle. In order to compensate for this fall off, a compensating means is provided in the form of mirrors 14, which include an angle of from 90° to 105° with respect to the radiation source 12. If the mirrors are highly reflective, that is almost 100 percent reflective, and absorption of radiation within the test space is negligible, all of the radiation generated by source 12, that is both light as well as heat is available to impinge on the test samples 18 at the inside of the surface of carrier 16. The radiation characteristic of the source with respect to the surface of the test samples will thus be cylindrically symmetrical. Square, or rectangular test samples may be applied to the surface of carrier 16 in large quantity. If the samples are rectangular, and the diameter of the cylinder formed by the carrier 16 is large with respect to the width of the samples, there will be little difference in radiation reaching the center, and the edges of the samples, and also little difference in radiation reaching samples located at the center of the carrier, or at one of the axial ends thereof. Typical sizes of samples are, for example, 22 cm. long and 4.5 cm. wide.

Mirrors 14 have two functions: they reflect radiation emitted in a direction other than perpendicular to the axis of the cylinder, and further, conjointly with the radiation source, form an optical system which is analogous to a source of radiation of infinite length with cylindrical-symmetrical characteristic. A cylindrical carrier surface for the samples has the distinct advantage that the samples can be placed tightly side-by-side, so that no space on the carrier surface is wasted, thus increasing the useful sample test carrier surface by about 20 percent over a spherical test carrier surface.

Figure 2:
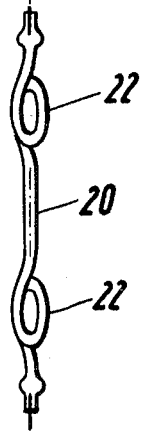
FIG. 2 illustrates a radiation source having increased radiation at the ends.

FIG. 2 illustrates an embodiment of the invention in which, rather than providing mirrors, the intensity of radiation towards the axial ends is increased so as to compensate for the otherwise occurring fall-off. This is achieved by looping the source 20 upon itself as loops 22; alternatively, additional radiation sources may be introduced, terminating at the end points of the source 20. Increasing the intensity of radiation towards the ends again provides for substantially constant radiation impinging on the test samples.

Figure 3:
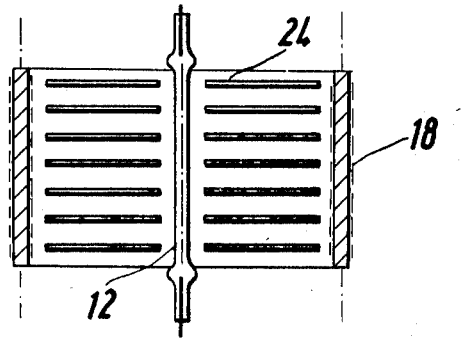
FIG. 3 is a schematic longitudinal sectional view illustrating a collimating arrangement.

Fall-off of radiation at the ends can also be compensated by utilizing collimating discs 24 (FIG. 3). Such collimating discs may be simply circular discs having an axial distance from each other which is small with respect to the diameter of the test sample carrier 16, on which samples 18 are placed. The collimating discs 24, which may be highly reflective, inhibit divergence of radiation emitted from source 12 towards carrier 16. Essentially all radiation reaching the test samples 18 will be applied thereto at substantially the same angle, so that the intensity of radiation applied to the sample surfaces will be uniform and even.

We claim:

1. Test apparatus to test light and heat radiation effects on sample surfaces comprising:

an elongated source of radiation (12, 20);

a cylindrical sample carrier (16) having an inwardly directed cylindrical sample carrier surface adapted to hold said samples on said surface in radiation-receiving relationship with said source, said elongated source (12, 20) being located along the axis of the cylinder formed by said surface; and means directing radiation outwardly from said source unto said surface to impinge upon said surface with intensity which is uniform and symmetrical with respect to any plane transverse to the axis of the cylinder, said radiation-directing means including radiation intensity compensating means arranged and located in optical relationship with said source to compensate for fall-off of intensity of radiation reaching the axial ends of said cylindrical surface, with respect to the central portions thereof.

2. Test apparatus to test light and heat radiation effects on sample surfaces comprising:

an elongated source of radiation (12, 20)

a cylindrical sample carrier (16) having an inwardly directed cylindrical sample carrier surface adapted to hold said samples on said surface in radiation-receiving relationship with said source, said elongated source (12, 20) being located along the axis of the cylinder formed by said surface; and means directing radiation outwardly from said source unto said surface to impinge upon said surface with intensity which is uniform and symmetrical with respect to any plane transverse to the axis of the cylinder, said radiation-directing means comprising means (FIG. 1:14; FIG. 2: 22) increasing the intensity of radiation impinging on said surface adjacent the axial ends of said cylindrical surface.

3. Apparatus according to claim 2, wherein said means increasing the intensity of radiation comprises (FIG. 1) mirror surfaces located at the axial ends of said light source directing and reflecting radiation from said source on said surface.

4. Apparatus according to claim 3, wherein said mirrors are located at the ends of said source and include an angle with respect to said source of between 90 to 105°.

5. Apparatus according to claim 2, wherein said means increasing the intensity of radiation comprises (FIG. 2) means (22) supplying additional radiation adjacent the terminal ends of the source.

6. Apparatus according to claim 5, wherein said means supplying additional radiation comprises a looped section (22) of said source adjacent each terminal end whereby the intensity of radiation emitted from said source adjacent its terminal ends is increased.

7. Test apparatus to test light and heat radiation effects on sample surfaces comprising:

an elongated source of radiation (12, 20), a cylindrical sample carrier (16) having an inwardly directed cylindrical sample carrier surface adapted to hold said samples on said surface in radiation-receiving relationship with said source, said elongated source (12, 20) being located along the axis of the cylinder formed by said surface; and means directing radiation outwardly from said source unto said surface to impinge upon said surface with intensity which is uniform and symmetrical with respect to any plane transverse to the axis of the cylinder, said radiation-directing means including radiation intensity compensating means comprising a plurality of parallel plates (24) extending radially outwardly from said source (12) and spaced from each other by a distance which is small with respect to the diameter of the surface to collimate radiation directed from said source (12) to said cylindrical surface and suppress and redirect divergent radiation from said source.